United States Patent [19]
Havens et al.

[11] Patent Number: 4,740,992
[45] Date of Patent: Apr. 26, 1988

[54] PEER RELATIONSHIP TRANSCEIVER

[75] Inventors: Joseph H. Havens, Reading; William T. Jones, Wyomissing Hills; David A. Snyder, Coopersburg, all of Pa.

[73] Assignee: American Telephone and Telegraph Company, AT&T Bell Laboratories, Murray Hill, N.J.

[21] Appl. No.: 857,144

[22] Filed: Apr. 29, 1986

[51] Int. Cl.⁴ .............................................. H04Q 5/00
[52] U.S. Cl. .................................. 375/7; 340/825.05; 370/86
[58] Field of Search .......... 340/825.5, 825.05, 825.51; 370/85, 86, 88; 375/7, 121; 455/608

[56] References Cited

U.S. PATENT DOCUMENTS

| | | | |
|---|---|---|---|
| 4,002,847 | 1/1977 | Dail ........................................ | 370/86 |
| 4,517,644 | 5/1985 | Hamada et al. ................. | 340/825.05 |
| 4,529,979 | 7/1985 | Kusama et al. ................. | 340/825.05 |
| 4,532,626 | 7/1985 | Flores et al. | |

OTHER PUBLICATIONS

An Introduction to Fiber Optics, Part 2: Connections and Networks, *Byte*, Jan. 1985, Richard S. Shuford.
Experimental Bidirectional Subscriber Loop Transmission System, *IEEE Transactions on Communications*, vol. COM-30, No. 9, Sep. 1982, T. Soejima, T. Tsuda, H. Ogiwara.
Technical Aspects of Data Communication, *Digital Equipment Corporation*, Digital Press, Jul. 1979, John E. McNamara.
Ethernet: Distributed Packet Switching for Local Computer Networks, *Computer Systems*, R. M. Metcalfe & D. R. Boggs, Xerox Palo Alto Research Center.
Fibernet II: A Fiber Optic Ethernet, *IEEE Journal on Selected Areas in Communications*, vol. SAC-1, No. 5, Nov. 1983, Ronald V. Schmidt, Eric G. Rawson, R. E. Norton, S. Jackson, M. Douglas Bailey.
Local Area Networks An Introduction, *Tutorial, Software & Microsystems*, vol. 2, No. 4, Aug. 1983, David Hutchinson.

*Primary Examiner*—Robert L. Griffin
*Assistant Examiner*—Stephen Chin
*Attorney, Agent, or Firm*—James H. Fox

[57] ABSTRACT

A transceiver is adapted for communication with another transceiver over a common channel by a technique that allows both transceivers to be identical in manufacture and use. The technique avoids designating one transceiver the "master" and the other the "slave", by relying on random time differences between transmissions during a start-up period that initially establishes communications. The transmissions are typically in multi-bit packets. An example using an optical transceiver having a light emitting diode used for both optical transmission and optical detection is given, wherein the channel is an optical fiber.

23 Claims, 4 Drawing Sheets

PEER RELATIONSHIP TRANSCEIVER

BACKGROUND OF THE INVENTION

1. Field of the Invention

The present invention relates to communicating between transceivers over a common communication channel.

2. Description of the Prior Art

When communicating between two transceivers over metallic conductors, optical fibers, or other media, there often is provided a defined relationship between the transceivers. That is, one of the transceivers is designated as the "master", and the other as the "slave". This designation is useful when prescribing the protocol for establishing communications between the transceivers. For example, the master may send out a pulse or other signal to activate the slave when communications are desired. This allows bi-directional communications over a single channel, by time sharing the channel between the two transceivers. If a suitable protocol were not established, there is the possibility that a transceiver will attempt to transmit while data is incoming, which can result in lost information.

One early technique for allocating communication time slots among stations was the "Aloha net", wherein a station desiring to transmit would broadcast a burst of digital data to a number of other stations. The address of the intended station was included in the transmission, and the transmitting frequency was then monitored by the transmitting station to determine whether another station had transmitted at the same time. If so, the transmission to the desired location was repeated, to ensure that the information was not lost due to interference.

The use of two transceivers in a time-shared manner over a single communication channel is usually referred to as "half-duplex" operation. Transmitting digital signals in time-shared groups is also referred to as the "burst mode" or "ping-pong" technique. It is possible to avoid the time-sharing requirements of these techniques, but at the cost of an additional channel, resulting in "full duplex" operation.

In the half-duplex technique, the slave is maintained in a state receptive to the signal transmitted from the master at least during the approximate time period during which communications are expected. Normally, transmissions from the slave unit are inhibited during this waiting period. For these and possibly other reasons, the master and slave units are required to be differentiated in some manner. This differentiation is accomplished by a change in the characteristics of the transceivers during manufacture or use. For example, in one current half-duplex transceiver implemented in an integrated circuit chip, both the master and slave transceiver chips are initially formed identically. That is, their time bases, transmitter, and receiver portions are initially identical as formed on the chip. However, during a latter phase of the production process, a different metalization pattern designates one unit as the master, and the other as the slave. It is also possible for the user to perform the designation, as by the appropriate connection of an integrated circuit terminal. The designation by whatever technique then causes the slave transceiver to remain in the receiver state until the signaling pulse is received from the master. That is, only the master can initiate communications over the channel.

The prior art master/slave designation has the disadvantage that the flexibility of use of a given transceiver is reduced, since it can perform only as a master or slave after a given designation. Also, if the designation is performed during manufacture, then two different types of transceivers must be manufactured, stocked, and distributed, increasing marketing costs. If the designation is to be performed by the user, additional instructions and labor are required for installation. Furthermore, if the transceivers are part of a switched system employing more than one half duplex channel, then the flexibility in assigning a transceiver to a given channel is reduced, since the appropriate master/slave relationship must be maintained at the ends of the channel. It would clearly be desirable to obtain a half-duplex transceiver that avoids the necessity of the master/slave designation.

Another prior art technique that allows for bidirectional communications over a single channel utilizes a collision detection scheme. For example, the Ethernet (a trademark of Xerox Corp.) networking technique uses transceivers that monitor the common channel for incoming messages and traffic between other units. A given transceiver transmits only when the channel is not busy. It is possible for transmission to begin just as traffic is detected, resulting in a "collision", wherein data from two (or more) transceivers are simultaneously present on the channel. The two (or more) colliding transceivers then wait a random time period before attempting transmission again. If re-transmission is not then successful because of a second collision, the time period is again changed. Note however that in the Ethernet technique each transceiver on the network must still be designated in some manner to specify its address to other units. Furthermore, the collision avoidance technique must be practiced every time a transmission is to begin. Also, relatively sophisticated control circuitry is required to detect and avoid collisions. Hence, this networking technique is overly complicated than is desirable for implementing a low-cost two-transceiver communication link over a single channel.

SUMMARY OF THE INVENTION

We have invented a technique whereby two transceivers communicate over a common channel. To initially establish communications, each transceiver is adapted to transmit a start signal, and then listen for a start signal from the other transceiver. Each transceiver is designed to transmit the start signal again if no start signal is received from the other transceiver within a listening time period. A random time difference between the periodic transmissions by the transceivers provides that the start signal transmitted from one of the transceivers will eventually get through to the other during its listening period. This difference may be due to the small difference between the frequencies of each transceiver's local time base. In a preferred embodiment, the difference is predominantly due to a circuit that substantially increases the randomness of the listening period, without affecting the frequency of the transceiver's local time base. The present technique allows the transceivers to be identical (within normal tolerances) in manufacture and use if desired.

DETAILED DESCRIPTION

The following detailed description relates to a technique for communicating between two transceivers having a peer relationship, whereby designating one the master and the other the slave is avoided. The inventive technique provides that the transceivers transmit (and receive) at different times due to a start-up procedure using time variations that are statistically random (or pseudo-random) in nature. By detecting an incoming start signal during a listening period, the two transceivers are synchronized for communication without the necessity of collision detection. Furthermore, the transceivers can be identical within normal tolerances as manufactured.

The present invention provides for a "start-up" procedure whereby each transceiver periodically transmits a "start" signal, usually a defined sequence of bits in a packet, and then listens for the start signal from the other transceiver. The time periods between transmissions of the start signal are at least slightly different for the two transceivers. The minimum length of the "listening period" is typically chosen to allow for the maximum specified round-trip propagation delay time over the channel, plus the time to receive the start signal (typically equal to the duration of a packet). Using terms as defined below, the minimum listening period is then typically 2A+P. During start-up, the difference between the transmission time periods ensures that one of the start signals will eventually arrive at the other transceiver when that other transceiver is listening for it, thereby establishing the link. Once the link is established, the information signals, typically multi-bit data packets, maintain the synchronism between the transceivers. The time difference between the transmission periods during start-up is typically due to random differences in component values within desired manufacturing tolerances. The time difference may be enhanced by changes in temperature, operating voltage, component aging, or other factors that tend to independently affect the transceivers in a random manner.

Figure 1:
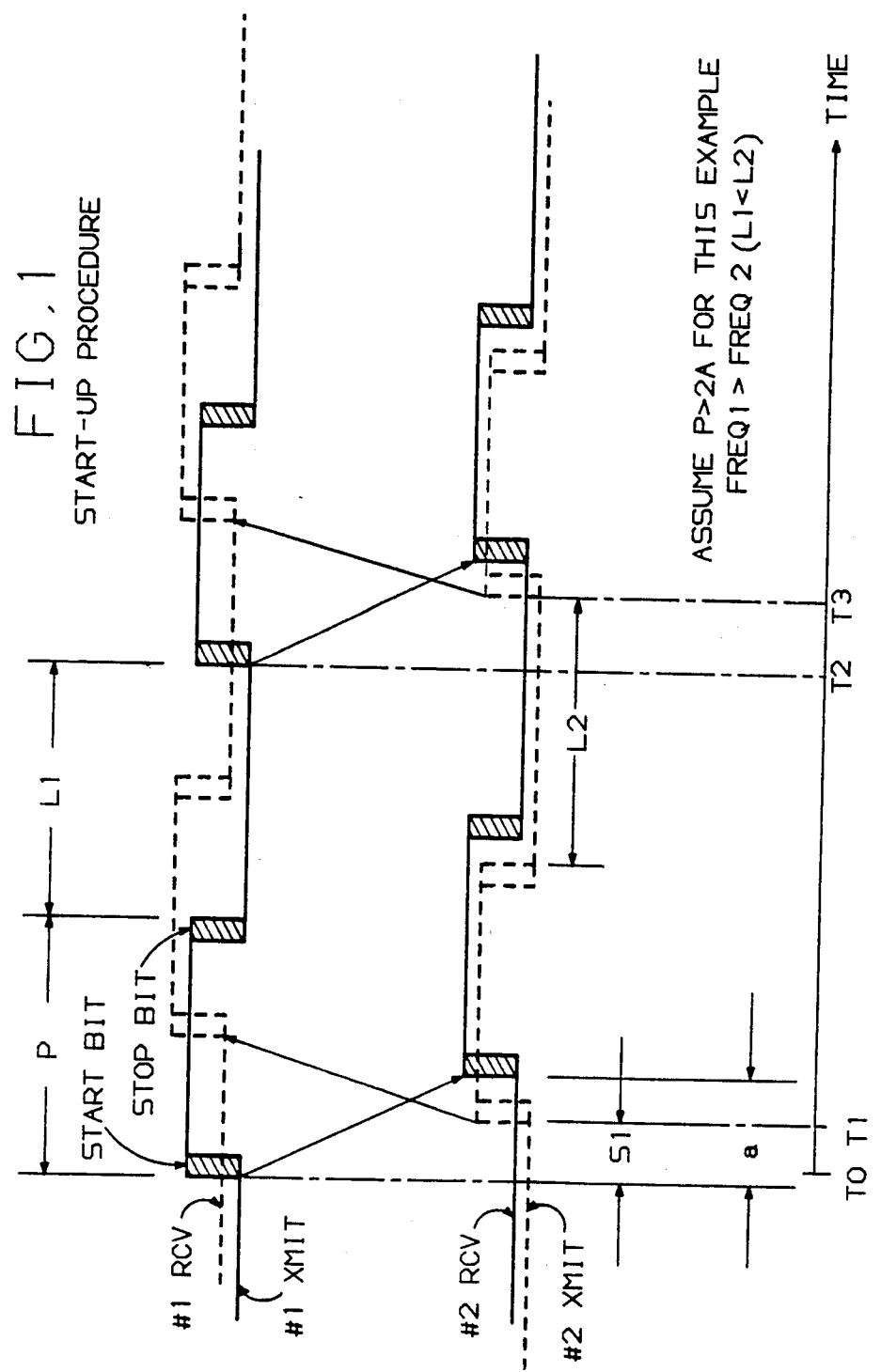
FIG. 1 shows in time sequence establishing synchronization according to the invention technique.

A typical startup sequence that illustrates the present invention is shown in FIG. 1. At time T0 the first transceiver is activated, and transmits a start signal, typically a multi-bit data packet having a time duration P. This packet traverses the communication channel and arrives at the second transceiver after a propagation delay of a. Following this transmission, the first transceiver activates its receiver, which listens for an incoming start signal for a listening period having duration L. (For simplicity of illustration, no waiting period to allow reflections to die out is included prior to activating the receiver.) The start signal is the combination of the "start" and "stop" bits of the packet in this illustrative case, but may be any desired sequence of bits in the packet. As shown, since no start signal is incoming during the first listening period, the first transceiver again transmits a packet at time T2. The second transceiver is activated at time T1, which is S1 later than the activation of the first transceiver. After the transmission of its packet, the second transceiver also listens for a listening period. As shown, no start signal is received during this time either. Hence, the second transceiver again transmits a packet at time T3.

Due to the random difference in the period between transmissions, eventually a start signal will be received by one of the transceivers during its listening period. At that time, the transceiver detects the start signal, terminates the listening period and (after the optional waiting period R) starts transmitting a packet to the other transceiver. When both transceivers have recognized the start signal within their listening periods, the transceivers are synchronized. Thereafter, a number of packets containing a fixed bit pattern may be exchanged between the transceivers, to verify proper synchronization. Each transceiver then switches to a state receptive to transmit and receive the user data. In a presently preferred embodiment, each transceiver also switches to a shorter listening period once synchronization is initially achieved, to reduce the time required to detect the loss of data, as due to noise, or a break in the channel, etc. For example, if L=1 millisecond during the start-up sequence, then changing to L=50 microseconds after synchronization is achieved allows for rapidly detecting loss of data. The transceivers are typically designed to reset L to the longer period when power is lost.

For an example of the time required for start-up, if the local time base of each transceiver uses a crystal oscillator having a design frequency of 1 megahertz and a tolerance of 0.01 percent, the time bases will differ in frequency by no more than 200 hertz. However, there is some difference, due to the inevitable statistical variations in the component values or operating conditions (e.g., temperature or power supply voltage) of the two transceivers. Because of this relatively small but inevitable difference in frequency, after a certain time period the transmissions from one of the transceivers will diverge sufficiently from the transmissions from the other transceiver that the transmissions will not overlap. (A resistance-capacitance type oscillator may be used to provide a larger tolerance, and shorter start-up time.) Thus, as indicated in FIG. 1, the transmission of the start signal from transceiver one will eventually arrive at transceiver two during transceiver two's listening period. As noted, the listening period is a random variable that is chosen to be greater than a desired minimum time. However, it is desirable that it not be excessively long, in order to minimize the time required for start-up. We recommend a listening period having a value less than 1000 times the duration of the start signal, which duration is typically the same as the duration of a data packet. In most cases, particularly in local area transmission systems, the listening period is less than 100 milliseconds, and typically less than 10 milliseconds.

In a preferred embodiment, rather than relying solely on the relatively small differences in the time base oscillators, a "randomizing" circuit is used that produces relatively larger variations in the listening period without affecting the frequency of the time base oscillator. This is effective because a change in the listening period also produces a change in the time interval between the periodic transmission of the start signal. Hence, the statistical difference between the transmission intervals for the two transceivers is increased. In this manner, the average time required for start-up is reduced, while allowing for ease of maintaining synchronization of a high data rate after start-up is achieved. If the communications channel is broken or otherwise interfered with, the startup sequence will again be initiated, since a given transceiver will not then have received a signal within its listening time period. Hence, communication may again be established.

If a data buffer (optional) is provided in each transceiver, the communication can appear to be full duplex to the user. For example, the actual half-duplex data rate may be about 600 kilobits per second in each direction, which will allow each end user to send and receive at a constant 19 kilobit rate, allowing for oversampling the user data, the inclusion of control bits, and propagation delays. If the data buffer has sufficient capacity, even monentary breaks in the communication channel need not be apparent to the users, since the transceivers can automatically re-initiate the above startup procedure until synchronization is again achieved, and retransmit the missing data.

Also, as is known in the art, an additional waiting period may be provided by each transceiver to allow reflections to die out in the channel before the transceiver transmits after receiving a transmission from the other end. Reflections are commonly present on a communication channel due to irregularities in the transmission medium at various points, usually including splices and equipment terminations. The irregularities include impedance mis-matches in the case of electrical conductors, and differences in the index of refraction in the case of optical conductors. Any reflections of a transmitted signal (from the near end) tend to mask the signal received from the far end. However, this additional waiting period is optional insofar as the present invention is concerned. That is, the reflections may not be of sufficient magnitude to interfere with the desired signal, or may be removed by echo-cancelers or dealt with otherwise.

Figure 2:
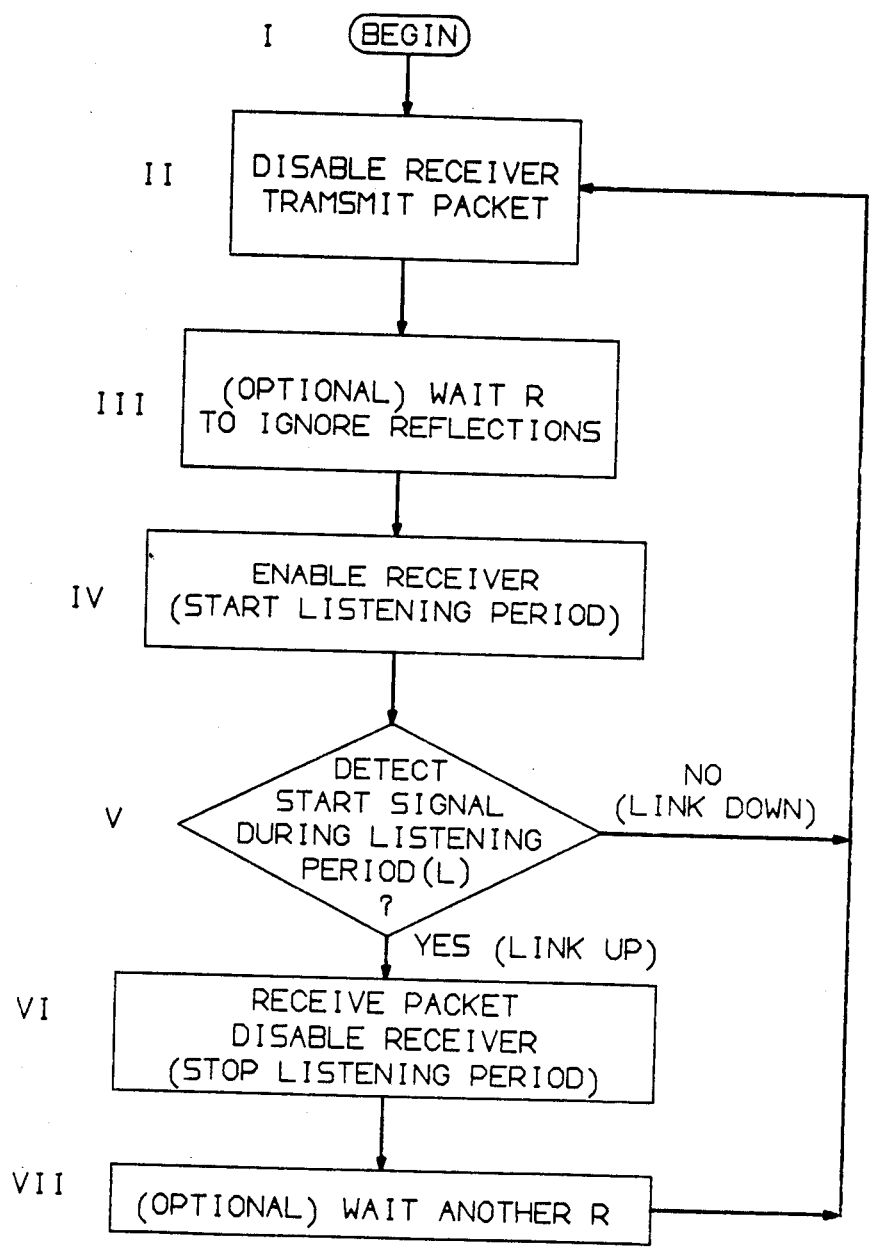
FIG. 2 shows an exemplary protocol for establishing communications according to the inventive technique, and also provides for reflections to be ignored.

Referring to FIG. 2, a sequence of operations for implementing the present invention in a given transceiver is shown. The "begin" step may occur when power is applied to the transceiver, and normally occurs independently for the two transceivers at opposite ends of a given channel. The transmitter then sends out the start signal (e.g., a multi-bit packet), while the receiver is disabled. The inclusion of an optional waiting period to allow reflections to be ignored is provided by adding a time period R before enabling the receiver. The waiting period is typically of duration 2A, wherein A is the propagation time of a signal over the maximum length communication channel with which the transceiver is designed to operate. For a local area type transmission system, the length is typically less than 10 kilometers. However, the present technique may be practiced with channels of any length. The round trip time (2A) then allows for a reflection from the far end of a channel having the maximum length (or less) to be ignored by the receiver. However, other waiting periods may be suitable. For example, a shorter waiting period may be acceptable if it is known that the far end reflection is relatively small in magnitude, or if the channel actually used is less than the maximum design length. Alternately, the waiting period R may be longer than 2A if additional attenuation of reflections is desired. Typically, the waiting period allows for an integral number of roundtrips for the signal, over a channel having the maximum design length, and hence typically $R = nA$, where n is an even integer.

Upon enabling the receiver after this first optional waiting period, the listening period begins. If a start signal is not detected during the listening period, the transmitter again transmits a start signal. However, when a start signal is detected during the listening period, synchronization (i.e., "link-up") is achieved. Note that if the first optional waiting period is included, then a second waiting period, typically also of duration R, may be provided after detecting the start signal and before enabling the transmitter. The second waiting period allows for communicating over channels of less than the maximum length. Otherwise data could be lost, since the transceiver at the other end of the channel is then disabled from receiving during its first optional waiting period, in order to allow the reflection to be ignored at the far end in a comparable manner as above. By making the second optional waiting period to be equal to the first, it is not necessary to specify a minimum length for the channel.

Figure 3:
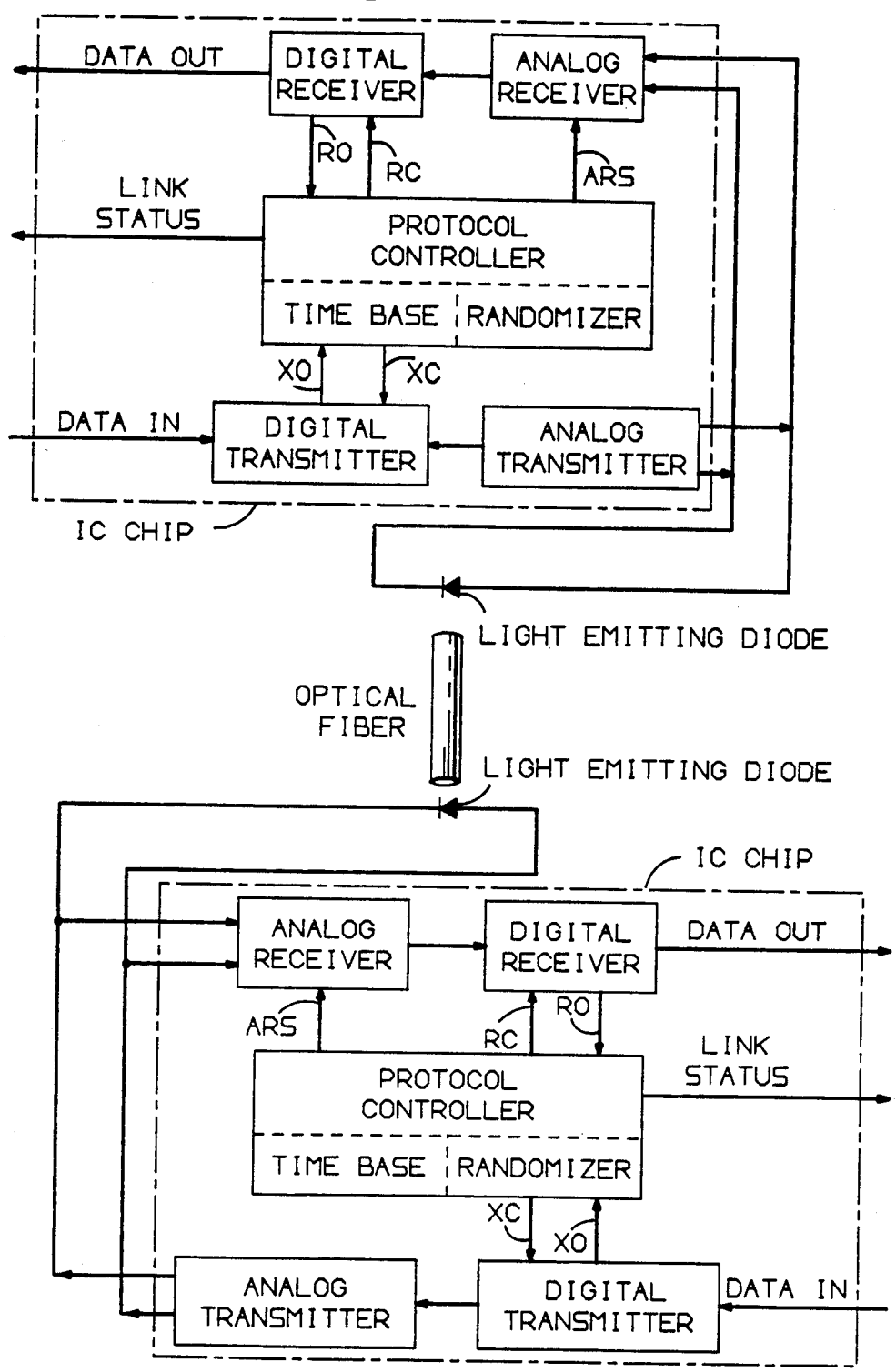
FIG. 3 shows a diagram of a transceiver implementing the inventive technique.

An examplary embodiment of the present technique using optical transceivers is shown in FIG. 3. In this embodiment, each transceiver utilizes a single light emitting diode (the "diode") for both transmitting optical signals, and also for receiving optical signals, by employing the diode as a photodetector, according to principles known in the art. Alternately, a separate optical source (e.g., laser or light emitting diode) may be used with a separate photodetector (e.g., pin diode, avalanche diode, phototransistor, etc.) by means of an optical coupler, according to principles known in the art. The two transceivers communicate via an optical fiber channel.

The analog receiver amplifies the electrical signals from the diode during reception of optical signals, and supplies the amplified signal to the digital receiver, which is under the control of the protocol controller. The digital receiver operates on the data packets received, and converts the packets to a form suitable to the user via the "data out" line, along with a control signal to indicate the reception of the word. For example, if the user data is oversampled and encoded, then the digital receiver may convert the data back to its original form.

A digital transmitter, also under the control of the protocol controller, receives data and control signals from a desired data source, and provides suitably formatted data packets to the analog transmitter. The analog transmitter provides sufficient current amplification to drive the diode so as to generate the optical signal for transmission. A time base oscillator provides timing signals, and a randomizer circuit increases the randomness of the listening period over the randomness of the local time base, as discussed below. As indicated, in a typical case, all of the circuitry, with the exception of the diode (and quartz crystal—not shown), is located on a single integrated circuit. However, it may be advantageous in some cases to integrate the analog portions of the circuitry on one integrated circuit, and the digital portions on another integrated circuit, to allow for optimized processing for each.

In order to implement a RS232 transceiver, suitable system parameters to obtain a 19.2 kilobit/second user data rate are as follows:

1. User data (at 19.2 kilobits/second) is sampled at 397.7 kilobits/second.
2. A group of 31 samples is encoded into each packet.
3. Optical coding is non return to zero (NRZ).
4. Packet size is 13 bits, including a start bit, a stop bit, 2 control bits, and 9 data bits.
5. The optical transmission and reception rates are 596.59 kilobits/second.

6. The time base oscillator operates at 14.31818 MHz.
7. The maximum optical fiber propagation delay (A) is assumed to be 5 microseconds, providing for a maximum fiber length of about 1 kilometer.
8. The waiting time (R) for echo suppression is 10.057 microseconds (i.e., about 2A).
9. The duration of an optical packet is 21.79 microseconds.

The protocol controller implements the protocol shown in FIG. 2 by control signals as follows:

ARS Analog Receive Set: When this line is high the receiver is in its active state ready to receive data from the diode. When ARS is low then the receiver is in a state where it holds the receive detection threshold to avoid having it upset by the much larger transmit signals.

Link Status: This line goes high to signify that communications has been established. When Link Status is high then it will go low if a packet is not received within the listening period.

RC Receive Control: This line goes high to enable the Digital Receiver. When low, it clears the circuitry of the Digital Receiver. When the Protocol Controller sees that RO has gone high (signifying that the Digital Receiver has received a data packet from the fiber) then RC will go low after about 10 µS. This delay allows sufficient time for the packet to be decoded and loaded into the 31 bit receiver register.

RO Receiver Over: The Digital Receiver causes this line to go high immediately after it has received a valid packet from the fiber. RO can only go high when RC is high.

XC Transmit Control: This line goes high to enable the Digital Transmitter. It is actually the clear control for the blocks within the Digital Transmitter. When the Protocol Controller sees that XO has gone high (signifying that the Digital Transmitter is finished) then XC will go low after a period defined by the time base (139.7 nanoseconds).

XO Transmit Over: The Digital Transmitter causes this line to go high only after it has finished sending a packet of data onto the fiber. XO can only go high when XC is high.

Figure 4:
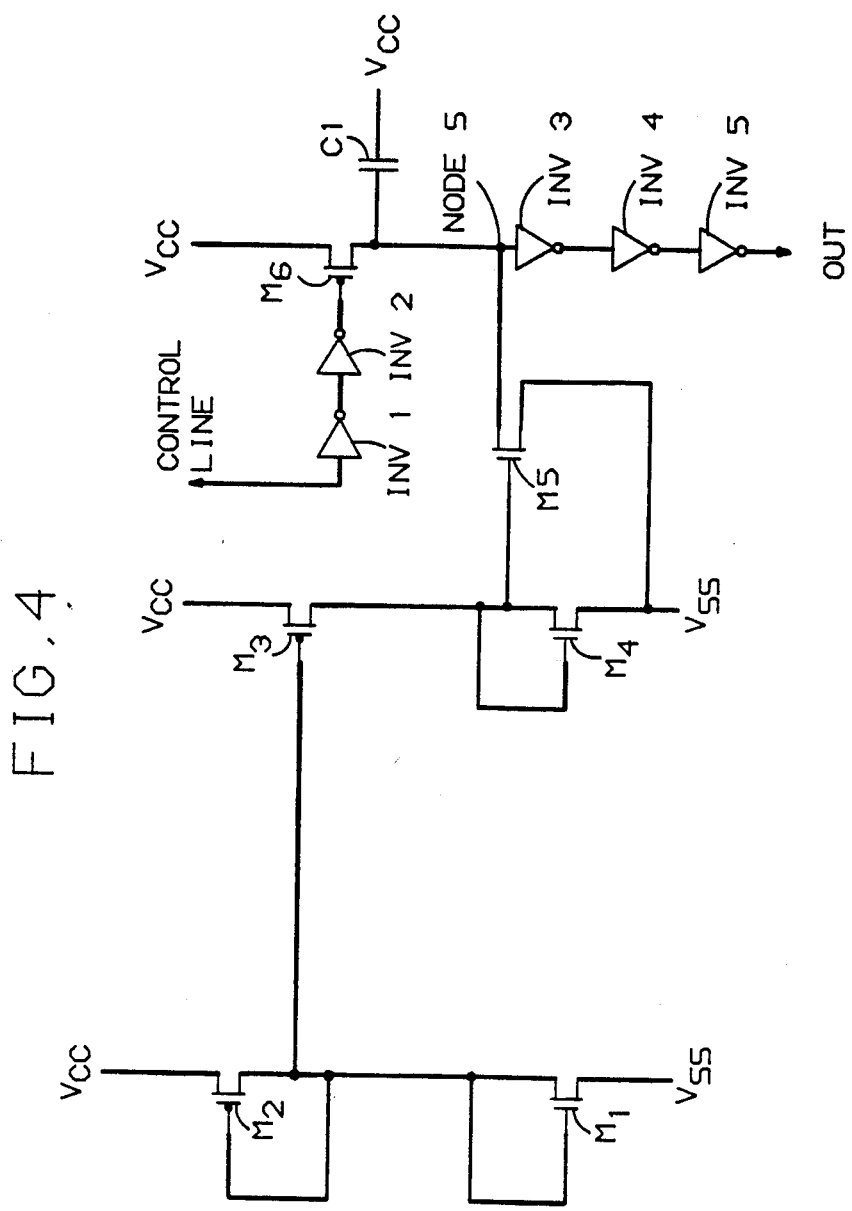
FIG. 4 shows a circuit suitable for randomizing the listening period.

According to the preferred embodiment, each transceiver includes a randomizer circuit. This substantially increases the random variation of the listening time from one transceiver to another, as compared to the random variation due to the local time base, but without affecting the frequency of the local time base. A suitable circuit is shown in FIG. 4, wherein the well-known variability of the characteristics of field effect transistors is used for this purpose. The power supply voltage is imposed across series connected devices M1 and M2, which are gate-drain shorted. Transistors M2–M3 and M4–M5 form a current mirror that divides the current I1 to a smaller value. When the "control line", under the control of a clock referenced to the time base, goes high, the listening period is initiated, and M6 is turned off. This allows the small current through M5 to charge the capacitor C1 (about 20 picofarads), causing the voltage on node S to decrease. When node S reaches the switching threshold of inverter INV3, the "out" line goes high, which terminates the listening period. (A clock derived from the time base provides for the above-noted minimum delay of 2A+P if the random delay is less than this minimum value). The randomness of the delay from control line high to out high is due in part to the variation in the capacitance of C1, and especially the variability of the transconductances of transistors M1 and M2. This variability is relatively large in standard integrated circuit manufacturing processes. In addition, the circuit provides a high variability of delay due to changes in the power supply voltage, and also temperature. The delay ranges from about 100 microseconds to 2 milliseconds over expected variations in manufacturing tolerances, temperature, and power supply voltage. Other randomizing circuits may be used, or a pseudo-random number generator may be used for the randomizing function. Additionally, relying on electrical noise (e.g., a noisy diode) may provide this function, with still other techniques possible.

Note that although the exemplary embodiment has illustrated signals in multiple-bit packets having equal bit lengths, it is alternately possible to employ packets having different bit lengths. For example, if information traffic is heavier in a given direction, then a larger transmit packet (i.e., having more bits) may be used in that direction. It is also possible to dynamically alter the packet length, to optimize the information carrying capacity of the system as the information load changes. On the other hand, in very simple, low-cost systems, the transceivers may employ only a single bit packet. For example, pulse width modulation may be used, wherein a logic "1" is represented by a signal having a given duration (e.g., one microsecond), and a logic "0" is represented by a signal having another duration (e.g., two microseconds). In this manner, the absence of any signal on the channel can be recognized by either transceiver as the "link down" condition. The next received signal (either a "1" or "0") may then be used as the start signal in the startup procedure noted above. It is also possible that the startup signal may be a multiple-bit packet having a different number of bits than an information bit packet. For example, if the information packet has a large number of bits, it may be more efficient to use a start packet having fewer bits, to reduce the average required startup time. Furthermore, the use of a fixed length start packet may be useful in facilitating start-up when the information packets are of variable length, as noted above. Although the start signal illustrated above includes start and stop bits in a packet, the start signal may be readily implemented with Manchester encoded data by recognizing a 0 to 1 transition, without the inclusion of a stop bit. Other start signal schemes are also possible.

Means may also be included in the transceiver to determine the actual propagation time (a) for the channel in use (as opposed to the assumed maximum time A), and adjust the length of the information packet, or period between packets accordingly, after start-up is achieved. Also, once the link is established, a measure of the actual propagation time (a) may advantageously be used to keep the receiver of a given transceiver disabled following a transmission by its transmitter until just prior to the time a return packet (from the other transceiver) is expected. This reduces the possibility that noise will be mistaken for an information signal. While a given transceiver may be designed to work with a channel having a given maximum propagation time (A), this need not be the case. For example, a channel of arbitrary length may be used, with the transceiver data rate from the user being reduced accordingly as the channel length (and propagation time) increases. This may be accommodated automatically if desired by sending a signal to the near-end user when a return packet is received from the far end. Finally, on long channels, it is possible for two or more packets to be propagating simultaneously on the channel. This is useful, for example, when the propagation delay is long compared to the packet duration (P), and/or long compared to the time required for a transceiver to switch between transmit and receive. For such long channels, the minimum listening period is then desirably less than 2A+P. Still other variations for utilizing the teachings of the present invention will become apparent to persons of skill in the art.

What is claimed is:

1. A transceiver adapted to communicate over a channel, said transceiver comprising: a transmitter adapted to transmit information at a rate controlled by a local time base; and a receiver adapted to receive information;

characterized in that said transceiver further comprises:

means for causing said transmitter to transmit a first outgoing start signal;

means for determining whether an incoming start signal is received during a listening period having a duration L that follows an outgoing start signal and an optional waiting period having a duration R that allows for at least one reflection to be ignored;

means for causing said transmitter to periodically transmit subsequent outgoing start signals if an incoming start signal is not received within a subsequent listening period;

and means for switching said transceiver from a synchronization mode to a data communication if an incoming start signal is received during at least one listening period;

wherein said listening period is a random variable generated by said transceiver.

2. The transceiver of claim 1 further characterized in that said transmitter transmits said first outgoing start signal when power is applied to said transceiver.

3. The transceiver of claim 1 further comprising means for deriving from said local time base a minimum value for said listening period.

4. The transceiver of claim 3 wherein said minimum value is at least the duration of said incoming start signal.

5. The transceiver of claim 4 adapted to communicate over a channel having a maximum propagation time (A), and wherein said minimum value is the duration of said incoming start signal plus twice said maximum propagation time of said channel.

6. The transceiver of claim 1 further comprising a randomizing means that substantially increases the randomness of the listening period without affecting the frequency of said local time base.

7. The transceiver of claim 6 wherein said local time base is a crystal oscillator.

8. The transceiver of claim 1 wherein said listening period depends primarily on the frequency of said local time base.

9. The transceiver of claim 1 wherein said listening period is substantially influenced by at least one of the factors selected from the group consisting of: manufacturing tolerance, temperature, power supply voltage, and component aging.

10. The transceiver of claim 1 adapted to communicate over a channel having a maximum propagation time (A) and including said waiting period (R), and wherein R is approximately equal to twice said maximum propagation time (2A).

11. The transceiver of claim 1 wherein said listening period is less than 100 milliseconds.

12. The transceiver of claim 1 wherein said listening period is less than 1000 times the duration of said start signal.

13. The transceiver of claim 1 wherein said means for transmitting a start signal is adapted to transmit a multi-bit packet having a given bit pattern, and said means for determining is adapted to recognize said given bit pattern.

14. The transceiver of claim 1 wherein the duration of said outgoing start signal is equal to the duration of said incoming start signal.

15. The transceiver of claim 1 adapted to transmitting and receiving said information in multiple-bit data packets.

16. The transceiver of claim 15 further comprising data buffer means adapted to accepting said information at a given bit rate from a data source and transmitting said information over said channel in packets at a higher bit rate.

17. The transceiver of claim 1 wherein said transmitter is an optical transmitter, and said channel comprises an optical fiber.

18. The transceiver of claim 1 wherein a diode is utilized for generating optical signals for transmitting information, with said diode also being utilized for detecting optical information.

19. The transceiver of claim 1, wherein at least said means for determining, said means for terminating, and said means for causing are all located on a single integrated circuit.

20. A communications system comprising two transceivers according to claim 1 and a channel therebetween.

21. The system of claim 20 wherein said two transceivers are identical within desired manufacturing tolerances.

22. The system of claim 20 wherein said channel comprises an optical fiber.

23. The system of claim 20 wherein said channel has a length of less than 10 kilometers.

* * * * *